3,462,379
PURIFICATION OF POLY(ALKYLENE OXIDES)
Arthur E. Gurgiolo and Ralph R. Langner, Lake Jackson, Tex., assignors to The Dow Chemical Company, Midland, Mich., a corporation of Delaware
No Drawing. Filed Dec. 2, 1965, Ser. No. 511,244
Int. Cl. C08g 23/06
U.S. Cl. 260—2                                    8 Claims

ABSTRACT OF THE DISCLOSURE

Solid, elastomeric polyoxyalkylene compounds are improved in color, stability and/or tensile strength by mastication with hot water, preferably acidified. If the temperature of the wash water is gradually lowered while the elastomer is being milled, the material breaks down into a desirable shredded form.

---

This invention relates to processes for improving the properties of solid, water-insoluble polymers of alkylene oxides.

Various catalysts and techniques have been developed in recent years for making high polymers of alkylene oxides. As made, these polymers are solids which include the catalyst or catalyst residue which is typically a compound of Fe, Al, Zn, or the like, usually in the form of the metal oxide, hydroxide, alcoholate, or the like. The presence of these catalyst residues is objectionable because they often discolor the product, lower its tensile strength, impair its oxidative stability, or otherwise adversely affect its physical or chemical properties. In past practice the only feasible method of removing these catalyst residues has involved dissolving the polymer in an organic solvent, separating the catalyst residue, and then recovering the polymer from the solution. This is a cumbersome and expensive procedure because of the handling problems and losses inherent in the use of large volumes of such solvents.

According to the present invention, the properties of crude solid, water-insoluble poly(alkllene oxides) are improved by intimately contacting the polymer with hot water, i.e., at a temperature of at least 75° C., and preferably at least 90° C. Such treatment improves the tensile strength and also frequently improves the color and stability.

According to one aspect of the invention, the beneficial effects of the hot water treatment are increased if the water is acidified with a water-soluble acid. Such acid wash is particularly effective for removing or inactivating catalyst residue and improving the color of the polymers. The removal of residues containing Fe is often desirable because of the objectionable color of the Fe compounds. Where other metals are concerned it is usually sufficient to inactivate the catalyst by the acid treatment.

According to anther aspect of the invention, when the above wash treatments are carried out by milling, i.e., masticating, the polymer while in contact with the hot water or aqueous acid, the polymer can be easily and quickly reduced to a highly desirable crumb form by gradually lowering the temperature of the polymer as milling continues under a water wash at the end of the washing step.

The term poly(alkylene oxide) as used herein includes polymers and copolymers consisting predominantly of alkylenoxy groups. Typically they are made by the condensation of one or more alkylene oxides with a "starter" or initiator which may be water, glycol, glycerol or other compound containing active hydrogen. The term "alkylene" as used herein refers to vicinal alkylene groups which may or may not have inert substituents, such as halogen or phenyl. The common alkylene oxides useful for making polymers suitable for treatment according to the present invention include 1,2-propylene oxide, 1,2-butylene oxide, epichlorohydrin and styrene oxide. Minor proportions of other oxides, such as ethers and esters of glycidol, 1,2-epoxy-3-butene, and the like can be copolymerized with the above oxides to provide modified polymers suitable for cross-linking or vulcanization. The hydrophylic oxides, such as ethylene oxide or glycidol, tend to make recovery of the polymer difficult if used at levels greater than about 30 percent. The amount of hydrophylic monomer that can be used is dependent upon the character of the dominant oxide.

In practicing the invention, the crude polymer is intimately contacted with hot water in a manner and for a time adequate to extract soluble impurities from the polymer. In a simple form the invention may involve merely soaking the comminuted polymer in hot water. This may require many hours, particularly if the polymer is merely chopped into pieces, such as one-inch cubes. Smaller pieces are extracted faster, of course, but such comminution is sometimes tedious and expensive.

In a preferred version of the invention, the polymer is milled or kneaded in a suitable machine, such as a Banbury mixer or the like, while flooded with, or immersed in, hot water. Since in this procedure the polymer is being constantly worked, its surface is being constantly renewed, and the impurities are extracted much faster.

In any of the above extraction procedures, the removal or inactivation of catalyst residues is vastly facilitated by the acidification of the water used in the extraction step. Suitable and inexpensive acids include sulfuric, hydrochloric, acetic, oxalic, succinic, citric and glycolic acids and the like. Since the common catalysts include compounds of Fe, Al, Zn and various other metals, it is evident that the choice of acid will depend somewhat on the catalyst residue that is to be removed.

In another preferred aspect of the invention, when a solid elastomeric poly(alkylene oxide) is milled with hot water and the temperature of the water is suitably lowered, a point is reached at which the polymer disintegrates into shreds, thus conveniently reducing the polymer to a physical form that is easily handled, bagged, baled, blended with other materials, and otherwise processed.

It will be readily apparent that these various aspects of the invention are readily combinable in any desired combination. Thus, a polymer can be milled with hot, acidified water to remove or inactivate catalyst residues and remove other impurities, then with plain hot water to remove traces of acid, and finally, with progressively colder water to shred the purified polymer.

The practice of the invention is illustrated by the following examples.

EXAMPLE 1.—EFFECTS OF HOT WATER MASTICATION ALONE ON IMPROVING TENSILES OF IRON CATALYZED POLYMERS

(A) Preparation of polymer

In a large kettle was charged 67.7 pounds of propylene oxide, 1960 grams of allyl glycidyl ether (6%) and 650 grams (4% based on monomers) of iron catalyst made as described in U.S. Patent 2,873,258, and 65 grams (0.5% based on monomers) of Ionol (2,6-di-tert-butyl-4-methylphenol).

The mixture was heated with agitation at 80–90° C. for 72 hours to effect polymerization. The polymer was a firm brown, rubbery solid, with a sticky feel on the surface.

(B) Extraction of polymer

An amount of 700 grams of the above crude polymer was chopped into one-inch cubes and dropped into a 2-liter beaker full of hot water thermostated at 90° C. and digested with occasional agitation for 6 hours. The cubes got somewhat sticky and had to be dissected occasionally. After 6 hours, the mass was removed and washed once with hot water and then vacuum dried. No handling loss was incurred, as the polymer was firm and coherent even though tacky while hot. The dried mass of polymer weighed 693 grams. The surface was essentially non-sticky.

(C) Vulcanization

Samples of the original untreated copolymer and of the extracted copolymer were vulcanized according to the following recipe and technique.

Recipe: Grams

Copolymer ------------------------------ 100
    Phenyl-beta-naphthylamine --------------- 2
    Stearic acid ---------------------------- 2
    Zinc oxide ------------------------------ 2
    Super processing furnace black (United 65—
      United Carbon Company) --------------- 35
    Sulfur (30–1, Stauffer Chemical Company) - 5
    Tetramethyl thiuram disulfide (Methyl Tuads—
      R. T. Vanderbilt Company) ------------- 2
    2-mercaptobenzothiazole (Captax—R. T. Vanderbilt Company) ---------------------- 2

These ingredients were compounded into the copolymer on a roll mill using the following technique:

Tap water was run through the mill rolls to keep them cool. The copolymer was banded on the mill. Then the phenyl-beta-naphthylamine, stearic acid, and zinc oxide were added at the same time. The carbon black was added next. Lastly, the sulfur, methyl Tuads, and Captax were added at the same time. After everything was added the mixture was milled an additional five minutes with frequent cutting with the mill knife to insure thorough mixing. Then the mixture was removed from the mill.

Vulcanization was accomplished by the following technique:

A 24-gram sample was cut from the above compounded stock and cured in a 4 x 5 x 0.065 inch metal mold at 320° F. and at about 30,000 pounds ram force for 40 minutes.

The vulcanized copolymers had the following properties:

|  | Untreated | Extracted |
|---|---|---|
| Tensile strength, p.s.i. | 1,090 | 1,700 |
| Elongation, percent | 470 | 438 |
| Modulus at 300% elongation, p.s.i. | 735 | 1,340 |

EXAMPLE 2.—ANOTHER BATCH COPOLYMER WAS MADE AS DESCRIBED IN EXAMPLE 1

A 1000 gram portion of this copolymer was digested in three gallons of hot water at 90–95° C. for five hours after being chopped into pieces. It was washed, cooled and vacuum dried. Dry wt.=985 grams.

Both unextracted and extracted copolymers were then compounded and vulcanized as described in Example 1.

| Sample | Vulcanized tensiles (p.s.i.), cure time (min.) | | | Elongation (percent) cure time (min.) | | | 300% modulus, cure time (min.) | | |
|---|---|---|---|---|---|---|---|---|---|
|  | 20 | 30 | 40 | 20 | 30 | 40 | 20 | 30 | 40 |
| Unextracted | 1,345 | 1,440 | 1,570 | 365 | 375 | 405 | 1,200 | 1,200 | 1,210 |
| Extracted | 1,660 | 1,755 | 1,785 | 430 | 430 | 440 | 1,190 | 1,200 | 1,260 |

EXAMPLE 3.—ACID WASHING OF IRON CATALYZED POLYMER

A Banbury mixer was equipped with steam heat so as to run hot when desired. The capacity was 6 liters. This was filled (6 liters) with 10 percent aqueous oxalic acid and 7 lb. of copolymer (dark brown in color) made as described in Example 1 was added as large masses. The polymer was masticated while applying steam heat so that the temperature was 90° C.

The polymer was digested 2 hours, then water was slowly and continuously added to wash out the acid. Washing was continued for two hours until it was neutral to indicator test paper. The polymer after two hours had decolorized from a deep red-brown color to a light yellow-amber color. After hot water washing, the steam was cut off and as the polymer cooled on the mixer it shredded into small crumbs. Cold water washing was continued for 2 hours.

The product was a light yellow crumb which possessed good tack but was non-sticky in character. It was spread out to dry; then further dried in a vacuum oven to complete drying at 40° C.

A 0.5 percent solution of the dry polymer was made in dioxane and the reduced viscosity obtained. The reduced viscosity was 1.324 at 30° C.

EXAMPLE 4.—ACID TREATMENT OF IRON CATALYZED COPOLYMER

In one dozen citrate bottles a solution polymerization copolymer was made.

Charge:
  1559 g. of benzene
  1232 g. of propylene oxide
  268 g. of allyl glycidyl ether These monomers were premixed and 204 g. of it was charged to each bottle along with 4.0 of the iron catalyst used in Example 1 per bottle. The bottles were capped and digested 5 days at 80° C. The product was a very sticky solution of deep brown copolymer.

A Banbury mixer was modified so that a steam line was connected to the jacket so as to keep the mixer hot by means of steam. The 12 bottles of copolymer in benzene were poured into the mixer and ¾ pound of oxalic acid was added, along with 6 grams of Ionol antioxidant. The mixer was started and water was added so as to fill but not overflow the mixer (about 3 gallons of water). The steam was turned on and the mix heated with venting to the atmosphere so that all the benzene evaporated off. Make-up water was added as necessary. All the benzene was removed after four hours of digestion and mastication. The polymer at this time was a light creamy color, and the liquid was a clear deep green color. The mixer was flushed with water, allowing it to drain over the sides, while steam was applied in full to keep the polymer warm. Flushing was continued 3½ hours to remove all iron and residual oxalic acid. Another 6 grams of Ionol was added and mixed in for 60 minutes. Then the steam was cut off and cold water added causing the polymer after a short period of time, as it cooled, to crumble into shreds of a creamy white color. It was then removed, drained, and vacuum dried 16 hours at 60° C. (29 mm. pressure). The final product weighed 820 g. representing a 68% yield.

EXAMPLE 5.—SHREDDING OF ZINC DIETHYL CATALYZED POLYMER

In a clean glass-lined reactor under $N_2$ gas, was charged 3779 g. of n-hexane, 620 g. of propylene oxide and 135 g. (3.5%) of allyl glycidyl ether. Analysis showed 124 p.p.m. water was present. The water level was adjusted to 260 p.p.m. Then 56.3 g. of a 20% solution of diethyl zinc in hexane was added. The vessel was sealed and heated to 90° C. for 15 hours. There was produced a very viscous, slightly turbid solution of copolymer.

As described in Example 4 this polymer was added to a Banbury mixer and the hexane flashed off. However, no acid was added to this polymer since the color was already clear and only slightly yellow. It was digested hot (added 1% Ionol) until all hexane was removed. As hexane disappeared the polymer shredded while still hot into milky white crumbs that were easily handled. It was dried overnight in a vacuum oven.

EXAMPLE 6.—SHREDDING OF ALUMINUM TRIETHYL 2,4-PENTANEDIONE-WATER CATALYZED TERPOLYMER

Charge:
3222 g. n-hexane
555 g. propylene oxide
39.6 g. allyl glycidyl ether
1.5 g. water. Aanalyzed mixture: 502 p.p.m. $H_2O$ Purge with dry $N_2$ gas
Added 12.3 g. acetylacetone (2,4-pentanedione)
Mixed
Added 90 g. 22.3% $AlEt_3$ in hexane
Sealed, mixed, and heated 15 minutes
Cooled, added 66.1 g. epichlorohydrin
Continued reaction at 70–80° C. for 16 hours The product was thick and gel-like. It was combined with another similar run and added to a Banbury mixer full of hot water, but with no acid since the product was clear and yellowish. After evaporating off the hexane, a clear yellow crumb was obtained even while hot. This was dried in vacuo. Yield 71 percent.

EXAMPLE 7.—ACID WASHING

In the same manner as in Example 3, iron-catalyzed polymers were washed with a 10 percent solution of citric acid and succinic acid, respectively, and the polymers recovered were shredded and were of a very desirable light yellow color. They could be vulcanized to rubbers with good physical properties.

EXAMPLE 8

Twenty-two lbs. of a mixture of 81 percent by weight of propylene oxide, 10 percent of epichlorohydrin, and 9 percent of 2-allyloxypropyl glycidyl ether together with 33 pounds of hexane solvent (monomer concentration 22 percent), 3.5 pounds of triethyl aluminum, 184 g. of 2,4-pentanedione and 24.4 g. of water were charged to a kettle and heated to 90° C. The reaction was completed in 2 hours and the polymer was emptied out into a container. There was recovered a mass of yellow, non-sticky rubbery polymer swollen with hexane.

Into a Banbury mixer was charged 402 g. of the hexane-swollen polymer and 6 liters of 10 percent aqueous oxalic acid. It was digested for two hours at 90° C. After 45 minutes all the hexane had volatilized and the polymer shredded into small crumbs. After two hours, the polymer was washed with water until all acid had been removed. Wash time=4 hours.

The polymer was dried in a vacuum oven. It was a pale white crumb.

Another portion of the polymer, 1.5 pounds, was not treated or extracted. It was vacuum dried, after being cut into half-inch pieces. There was recovered 134 grams of rubbery yellow polymer.

The oxidative shear stability of the acid treated, shredded polymer and the dried, but untreated polymer was determined at 150° C. for 1 hour in a Brabender Plastograph (C. W. Brabender Instruments, Inc., 50 E. Wesley St., South Hackensack, N.J.). A corn measuring head with rotors designed for evaluation of rubbers was used. The acid-treated polymer was found to resist oxidative shear degradation in a much more uniform manner than did the untreated polymer. Both polymers underwent a period of crosslinking during the first 30 minutes of shear. The acid-treated polymer had a decrease in shear torque of 0.04 percent while the untreated polymer had a decrease of 0.13 percent.

We claim:
1. The process of refining a crude, solid, water-insoluble poly(vic.-alkylene oxide) comprising masticating the polymer with hot water at a temperature of at least 75° C. until there is substantial improvement in at least one of the properties (1) color, (2) tensile strength and (3) oxidation stability.
2. The process of claim 1 wherein the polymer consists predominantly of repeating units derived from propylene oxide.
3. The process of claim 1 wherein the crude polymer contains catalyst residues containing one of the elements Fe, Al and Zn.
4. The process of claim 3 wherein the hot water is acidified with a water-soluble acid.
5. The process of claim 1 wherein the hot water-wash is followed by mastication in contact with water at progressively lower temperatures until the polymer mass breaks down into discrete shreds.
6. The process of claim 5 wherein the polymer is a copolymer consisting essentially of about 6–18 percent by weight of repeating units derived from allyl glycidyl ether and 82–94 percent of units derived from propylene oxide, said copolymer containing catalyst residues comprising Fe, Al or Zn.
7. The process of claim 6 wherein the crude copolymer is contacted with hot water acidified with a water-soluble acid that forms a water-soluble salt with the metallic component of the catalyst residue.
8. The process of claim 7 wherein the acid is oxalic acid.

References Cited
UNITED STATES PATENTS

| | | |
|---|---|---|
| 2,870,100 | 1/1959 | Stewart et al. |
| 3,135,705 | 6/1964 | Vandenberg. |
| 2,856,370 | 10/1958 | Muetterties _____ 260—20 X |
| 3,242,103 | 3/1966 | Velzmann _____ 260—20 X |

WILLIAM H. SHORT, Primary Examiner

T. PERTILLA, Assistant Examiner

U.S. Cl. X.R.
260—88.3